(12) United States Patent
Naganuma et al.

(10) Patent No.: US 10,568,347 B2
(45) Date of Patent: Feb. 25, 2020

(54) BOTTLED CARBONATED DRINK

(71) Applicants: KIRIN KABUSHIKI KAISHA, Tokyo (JP); KIRIN BEVERAGE KABUSHIKI KAISHA, Tokyo (JP)

(72) Inventors: Hiroyuki Naganuma, Tokyo (JP); Kenichiro Yamamoto, Tokyo (JP); Yuko Yotsumoto, Tokyo (JP); Hideyuki Wakabayashi, Tokyo (JP)

(73) Assignees: KIRIN HOLDINGS KABUSHIKI KAISHA, Nakano-Ku, Tokyo (JP); KIRIN BEVERAGE KABUSHIKI KAISHA, Nakano-ku, Tokyo (JP)

( * ) Notice: Subject to any disclaimer, the term of this patent is extended or adjusted under 35 U.S.C. 154(b) by 0 days.

(21) Appl. No.: 15/956,134

(22) Filed: Apr. 18, 2018

(65) Prior Publication Data

US 2018/0303132 A1 Oct. 25, 2018

Related U.S. Application Data (63) Continuation of application No. 14/908,828, filed as application No. PCT/JP2014/053709 on Feb. 18, 2014, now abandoned.

(30) Foreign Application Priority Data

Jul. 30, 2013 (JP) .................................. 2013-158305
Feb. 14, 2014 (JP) .................................. 2014-026474

(51) Int. Cl.
| *A23L 2/60* | (2006.01) |
| *A23L 2/54* | (2006.01) |
| *A23L 2/52* | (2006.01) |
| *A23L 2/58* | (2006.01) |

(52) U.S. Cl.
CPC .................. *A23L 2/54* (2013.01); *A23L 2/52* (2013.01); *A23L 2/58* (2013.01); *A23L 2/60* (2013.01); *A23V 2002/00* (2013.01)

(58) Field of Classification Search
CPC ...... A61K 2300/00; A61K 45/06; A61K 8/60; A61K 47/26; A23V 2250/214; A23V 2250/24; A23V 2002/00; A23V 2250/28; A23V 2250/5114; A23V 2250/242; A23V 2250/264; A23V 2200/204; A23V 2250/6408; A23L 2/60; A23L 2/52; A23L 27/30; A23L 27/88; A23L 33/105; A23L 1/236; A23L 1/09; A23L 1/30; A23L 2/54
See application file for complete search history.

(56) References Cited

U.S. PATENT DOCUMENTS

| 2004/0115329 | A1 | 6/2004 | Tamiya et al. | |
| 2005/0175754 | A1 | 8/2005 | Tomiyama et al. | |
| 2006/0051483 | A1 | 3/2006 | Watanabe et al. | |
| 2006/0222754 | A1* | 10/2006 | Singer | A23P 20/10 426/660 |
| 2007/0212460 | A1 | 9/2007 | Inoue et al. | |
| 2008/0226798 | A1 | 9/2008 | Talebi et al. | |
| 2008/0292766 | A1 | 11/2008 | Hoffman et al. | |
| 2010/0021495 | A1 | 1/2010 | Olsen | |
| 2012/0076908 | A1* | 3/2012 | Fujihara | A23L 2/60 426/548 |
| 2012/0156351 | A1 | 6/2012 | Miyazawa et al. | |
| 2014/0113050 | A1* | 4/2014 | Ito | A23L 2/38 426/548 |

FOREIGN PATENT DOCUMENTS

| JP | 2006-166870 | | 6/2006 |
| JP | 2008-228633 | A | 10/2008 |
| JP | 2010-527613 | A | 8/2010 |
| JP | 2011-045305 | A | 3/2011 |
| JP | 6030093 | B2 | 11/2016 |

OTHER PUBLICATIONS

Center for Science in the Public Interest, Test Show Carcinogen Levels in Coca-Cola Vary Wordwide, Jun. 26, 2012, http://www.cspinet.org/new/201206261.html (Year: 2012).*
"Notification of Reason for Revocation," dated Apr. 3, 2018, issued by the Japanese Patent Office in counterpart Japanese Patent Application No. 2014-149025.
"Argument" in Opposition No. 2017-700505, dated Apr. 3, 2018, issued by the Japanese Patent Office in counterpart Japanese Application No. 2014-149025.
Opposition Decision in Japanese Opposition No. 2017-700505, dated Jul. 23, 2018, issued by the Japanese Patent Office in connection with corresponding JP Application No. 2014-0149025.
"Tests Show Carcinogen Levels in Coca-Cola Vary Worldwide," Center for Science in the Public Interest, Jun. 26, 2012, 2 pages.
Office Action, dated Mar. 29, 2017, issued by the Australian Patent Office in counterpart Australian Patent Application No. 2014297705.
Communication, dated Feb. 15, 2018, issued by the Australian Patent Office in counterpart application No. 2014297705.

(Continued)

*Primary Examiner* — Hong T Yoo
(74) *Attorney, Agent, or Firm* — Sughrue Mion, PLLC (57) ABSTRACT

To provide a bottled carbonated drink including a sweetener and a caramel composition, wherein the drink contains an indigestible dextrin and the amount of 4-methylimidazole in the drink is less than 200 ppb. The drink is a bottled carbonated drink of which foam is stabilized.

4 Claims, 3 Drawing Sheets

(56) References Cited

OTHER PUBLICATIONS

Communication, dated Sep. 13, 2017, issued by the Intellectual Property Office of Australia in counterpart application No. 2014297705.
"Notification of Reason for Revocation," dated Sep. 29, 2017, issued by the Japanese Patent Office in counterpart Japanese Patent Application No. 2014-149025.
Decision of Rejection for Japanese Application No. 2014-026474, dated Apr. 25, 2014 (with English Translation).
Decision on Rejection for JP 20014-149025, dated May 10, 2016 (with English Translation).
"Natural Food Colorants Science and Technology," authored by Kamuf and 2 others, published by Marcel Dekker Inc., in 2000, Chapter 12 (12 Caramel Color), pp. 253 to 272.
Identification No. 2092752 of Mintel GNPD, "Fiber 8000 Ginger Ale" [Disclosure date: Jun. 2013; Printed out date: May 1, 2017], internet http://www.gnpd.com.
Identification No. 1585176 of Mintel GNPD, "Dry Ginger Ale" [Disclosure date: Jun. 2011; Printed out date: May 1, 2017], internet http://www.gnpd.com.
Identification No. 1008056 of Mintel GNPD, "Ginger Ale Dry" [Disclosure date: Nov. 2008; Printed out date: May 1, 2017], internet http://www.gnpd.com.
Identification No. 1789799 of Mintel GNPD, "Zero Cola Drink" [Disclosure date: May 2012; Printed out date: May 1, 2017], internet http://www.gnpd.com.
Identification No. 1211153 of Mintel GNPD, "Cola with Added Fiber" [Disclosure date: Nov. 2009; Printed out date: May 1, 2017], internet http://www.gnpd.com.
Identification No. 1624957 of Mintel GNPD, "Dry Cola Drink" [Disclosure date: Aug. 2011; Printed out date: May 1, 2017], internet http://www.gnpd.com.
Identification No. 1939430 of Mintel GNPD, "FOSHU Carbonated Cola Drink" [Disclosure date: Nov. 2011; Printed out date: May 1, 2017], internet http://www.gnpd.com.
Identification No. 970388 of Mintel GNPD, "Carbonated Drink" [Disclosure date: Sep. 2008; Printed out date: May 1, 2017], internet http://www.gnpd.com.
Identification No. 704369 of Mintel GNPD, "Low Calorie Carbonated Cola Drink" [Disclosure date: May 2007; Printed out date: May 1, 2017], internet http://www.gnpd.com.
Identification No. 371403 of Mintel GNPD, "Carbonated Drink" [Disclosure date: Jun. 2005; Printed out date: May 1, 2017], internet http://www.gnpd.com.
"Scientific Opinion on the re-evaluation of caramel colours (E150 a, b, c, d) as food Additives," EFSA Panel on Food Additives and Nutrient Sources added to Food (ANS), authored by European Food Safety Authority (EFSA), Parma, Italy, EFSA Journal, in 2011, 9th Edition, vol. 3 (2004), pp. 1-3 and 9.
Identification No. 201321 of Mintel GNPD, "Pepsi Light Drink" [Disclosure date: Apr. 2003; Printed out date: May 1, 2017], internet http://www.gnpd.com.
"D respective articles of Component Code/Storage Standards", Ministry of Health, Labour and Welfare, 8th Edition Food Additives Codex, pp. 281 to 287[online], [disclosed on the end of Mar. 2007; Printed out date: May 1, 2017], Internet http://www.mhlw.go.jp/seisakunitsuite/bunya/kenkou iryou/shokuhin/syokuten/dl/8e03.pdf.
"Thinking about GLP of Natural Additives from Quality of Caramel Pigment and Test Method Thereof in Our Country", authored by Masako Hirokado, Monthly Food Chemical, in 1997, vol. 13, No. 4, pp. 33-38.
"Development of Specifications for caramel colours", authored by Licht et al., Food and Chemical Toxicology, 1992, vol. 30, No. 5, pp. 383 to 387.
"Determination of 2-methylimidazole, 4-methylimidazole and 2-acetyl-4-(1,2,3,4-tetrahydroxybutyl)imidazole in caramel colours and cola using LC/MS/MS", authored by Schlee et al., Journal of Chromatography B, Oct. 23, 2012, vol. 927, pp. 223 to 226.
"Application of Indigestible Saccharides to Foods and Beverages,") authored by Makoto Tachibe & Hideki Fujiwara, Food Style 21, published in Sep. 2009, vol. 13, No. 9, pp. 56 to 57.
"Food Flavourings," authored by Ashurst, published by Blackie and Son Ltd, in 1991, pp. 164 to 171.
Hajime et al., "Application of modified starch and maltodextrins for carbonated beverages", Food Chemicals, 26(11):71-73 (2010).
Information Statement for Japanese Application No. 2014026474, dated Aug. 27, 2015.
Information Statement for Japanese Application No. 2014-149025, dated Sep. 1, 2016.
International Preliminary Report on Patentability, dated Feb. 11, 2016, issued by the International Bureau in corresponding International Application No. PCT/JP2014/053709.
International Search Report of PCT/JP2014/053709, dated Mar. 18, 2014.
ITmedia, www.itmedia.co.jp/bizid/articles, Mar. 26, 2012 (retrieved Jan. 19, 2015).
Notice of Reasons for Rejection for Japanese Application No. 2014-026474, dated Mar. 11, 2014 (with English Translation).
Notice of Reasons for Rejection for Japanese Application No. 2014-149025, dated Jan. 26, 2016 (with English Translation).
Written Opposition datedJun. 14, 2017 to Japanese Patent Application No. 2014-149025 (JP 6030093 B).

\* cited by examiner

BOTTLED CARBONATED DRINK

CROSS-REFERENCE TO RELATED APPLICATION

This is a continuation of U.S. application Ser. No. 14/908,828 filed Jan. 29, 2016, which is a U.S. National Stage of International Application No. PCT/JP2014/053709 filed Feb. 18, 2014, claiming priority based on Japanese Patent Application No. 2013-158305 filed Jul. 30, 2013 and Japanese Patent Application No. 2014-026474 filed Feb. 14, 2014, the contents of all of which are incorporated herein by reference in their entirety.

BACKGROUND OF THE INVENTION

Field of the Invention

The present invention relates to a bottled carbonated drink in which the amount of 4-methylimidazole is adjusted to a given value.

Background Art

A carbonated drink is a refreshing drink prepared by injecting a carbon dioxide gas into a drink, leading to absorption of the carbon dioxide gas into the drink in a supersaturated state, and is a drink with high palatability which is drunk while feeling invigorating sensation due to the carbon dioxide gas generated in the oral cavity and during pass-through the throat when drinking. Accordingly, foam in the carbonated drink exerts an important influence on taste when drinking, and invigorating sensation, so that stabilization of foam is one large factor which forms characteristics of the carbonated drink. With the recent diversification in consumer tastes, tastes of the carbonated drink also diversify, so that there are now provided various carbonated drinks prepared by the addition of taste and nutrient components such as juices, milk components, vitamins, and extracts, and the addition of flavor substances, including a cola-based carbonated drink.

Since the existence of foam in the drink is an important factor for good finish in the carbonated drink, retention of stable foam, that is, foam retention is an important factor for retention of invigorating sensation of the carbonated drink when drinking, and appearance of foaming (foam to be formed onto the top of a surface of the drink). In a carbon dioxide gas-containing drink, the primary emphasis has hitherto been on formation of foam, that is, foamability. However, the carbon dioxide gas-containing drink exhibits poor smoothness to the throat because of a large diameter of foam to be formed and is not necessarily preferred in view of invigorating sensation.

Meanwhile, formation of fine foam when drinking leads to satisfactory foam retention and smoothness to the throat, so that an improvement has been made so as to form fine foam when drinking in the production of the carbon dioxide gas-containing drink. For the purpose of promoting formation of fine stable foam or imparting retention of stable foam for a long time, there have been used various foaming agents and foam stabilizers for the production of a carbonated drink.

In foamable foods and drinks, there have hitherto been used various foaming agents or foaming auxiliaries, for example, proteins derived from animals and plants such as soybean protein, wheat protein, egg white peptide, gelatin, and casein sodium, or gums such as guar gum, xanthan gum, carrageenan, and carob bean gum so as to improve foamability, stability, and the like of the foamable foods and drinks. In the carbonated drink, there has also been developed various foaming agents or foam stabilizers for the improvement of formation and retention of foam in the drink. For example, Japanese Patent Application Laid-Open Publication No. 2003-304844 (Patent Document 1) discloses, as a foaming auxiliary, a black tea extract.

Japanese Patent Application Laid-Open Publication No. 2004-81171 (Patent Document 2) discloses a carbonic acid-based foamable drink containing therein an octenylsuccinic acid starch; Japanese Patent Application Laid-Open Publication No. 2009-11199 (Patent Document 3) discloses a carbon dioxide gas-containing drink containing an octenylsuccinic acid starch and a tea leaf extract; Japanese Patent Application Laid-Open Publication No. 2009-11200 (Patent Document 4) discloses a carbon dioxide gas-containing drink containing saponin and one or more foaming agents or foam stabilizers selected from octenylsuccinic acid starch, pectin, and tamarind gum; and WO 2003/105610 (Patent Document 5) discloses a carbonated drink containing therein a foam stabilizer composed of a tea leaf extract, and a foaming agent composed of a saponin extract extracted from animals and plants, a glycerol fatty acid ester, a propylene glycol fatty acid ester, a sucrose fatty acid ester, and a sorbitan fatty acid ester and the like, respectively.

PRIOR ART REFERENCES

Patent Documents

[Patent Document 1] Japanese Patent Application Laid-Open Publication No. 2003-304844
[Patent Document 2] Japanese Patent Application Laid-Open Publication No. 2004-81171
[Patent Document 3] Japanese Patent Application Laid-Open Publication No. 2009-11199
[Patent Document 4] Japanese Patent Application Laid-Open Publication No. 2009-11200
[Patent Document 5] WO 2003/105610

SUMMARY OF THE INVENTION

Improvements of foam of a carbonated drink, that is, formation of stable foam and retention of stable foam for a long time have hitherto been made by the addition of a foaming agent or a foam stabilizer. The carbonated drink containing the foaming agent or the foaming agent added therein retains sense of burst foam, and also forms smooth and hardly burstable foam. However, the carbonated drink containing the foaming agent sometimes has such a drawback that unfavorable flavor is imparted to the carbonated drink and a change in physical properties such as an increase in viscosity occurs, leading to low palatability. Particularly in the cola-based carbonated drink containing a caramel pigment, merchandise characteristics drastically deteriorate by imparting unfavorable flavor.

An object of the present invention is to provide a bottled carbonated drink (particularly, a cola-based carbonated drink containing a caramel composition) of which foam (foam to be formed onto the top of a surface of the drink) formed of a dissolved carbon dioxide (hereinafter simply referred to as a "carbon dioxide gas") is stabilized, and a method for producing the same, as well as a method for stabilizing foam of a bottled carbonated drink.

The present inventors have found that it is possible to retain foam for a long time, which is formed of a carbon dioxide gas, by adding an indigestible dextrin to a bottled carbonated drink comprising a sweetener and a caramel composition and adjusting the amount of 4-methylimidazole (hereinafter sometimes referred to as "4MI") in the drink to a given value, and to stabilize foam.

The present invention provides the following inventions.

(1) A bottled carbonated drink including a sweetener and a caramel composition, wherein the drink contains an indigestible dextrin and the amount of 4-methylimidazole in the drink is less than 200 ppb.
(2) The bottled carbonated drink according to (1), wherein the sweetener is a high-intensity sweetener.
(3) The bottled carbonated drink according to (2), wherein the high-intensity sweetener includes aspartame.
(4) The bottled carbonated drink according to (2) or (3), wherein the high-intensity sweetener comprises 0.01 to 0.2% by mass of the drink.
(5) The bottled carbonated drink according to any one of (1) to (4), wherein the caramel composition is a caramel pigment.
(6) The bottled carbonated drink according to (5), wherein the caramel pigment comprises 0.01 to 0.5% by mass of the drink.
(7) A method for producing a bottled carbonated drink including a sweetener and a caramel composition, the method comprises adjusting so that the drink contains an indigestible dextrin and the amount of 4-methylimidazole in the drink is less than 200 ppb.
(8) A method for stabilizing foam of a bottled carbonated drink including a sweetener and a caramel composition, the method comprises adjusting so that the drink contains an indigestible dextrin and the amount of 4-methylimidazole in the drink is less than 200 ppb.

The bottled carbonated drink of the present invention is capable of retaining foam formed of a carbon dioxide gas for a longer time. The bottled carbonated drink of the present invention has an advantage that foam can be stabilized by improving stability of foam in the carbonated drink without adding a foaming agent or a foam stabilizer, which may impart unfavorable flavor to exert an adverse influence on palatability.

DETAILED DESCRIPTION OF THE INVENTION

The bottled carbonated drink of the present invention is a bottled carbonated drink including a sweetener and a caramel composition, which is prepared by adding an indigestible dextrin and further adjusting the amount of 4-methylimidazole in the drink to less than 200 ppb. The bottled carbonated drink of the present invention is characterized in that foam formed of a carbon dioxide gas is stabilized.

Although the bottled carbonated drink of the present invention contains the above-mentioned components, there is no great difference between raw materials for production, production means, and production conditions except for the components, which are used for the production of the carbonated drink, and raw materials for production, production means, and production conditions of a known carbonated drink. It is possible to use, as raw materials for production of the carbonated drink, raw materials for production to be used as raw materials for production of a known carbonated drink, for example, taste and nutrient components, such as juices, milk components, vitamins, and extracts, and flavor substances. It is also possible to use, as production means and production conditions of the carbonated drink, production means and production conditions of a known carbonated drink. It is also possible to employ, as means for preparation of raw material solutions of a carbonated drink, means for heat sterilization and means for forcible feeding of a carbon dioxide gas, and treatment conditions, known means and treatment conditions.

The carbonated drink is a drink containing a carbon dioxide gas (carbon dioxide) forcibly fed therein, and a carbon dioxide pressure in the drink can be usually adjusted at 1.7 to 4.4 kg/cm2 (0.17 to 0.43 MPa), preferably 2.1 to 4.0 kg/cm2 (0.21 to 0.39 MPa), and more preferably 2.6 to 3.5 kg/cm2 (0.25 to 0.34 MPa), when measured at about 20° C. The carbon dioxide pressure in the drink can be usually adjusted at 2.8 to 7.1 kg/cm2 (0.27 to 0.70 MPa), preferably 3.5 to 6.4 kg/cm2 (0.34 to 0.63 MPa), and more preferably 4.0 to 5.0 kg/cm2 (0.39 to 0.49 MPa), when measured at about 5° C. It is preferred that the carbon dioxide pressure in the carbonated drink is adjusted within such a range since the carbonated drink thus obtained exhibits preferable texture of carbonic acid and also exhibits unexcessive stimulation and bitterness.

The carbon dioxide pressure in the carbonated drink can be measured using a commercially available mechanical carbon dioxide gas pressure analyzer, and can be measured using, for example, a gas volume analyzer (GVA-500, manufactured by KYOTO ELECTRONICS MANUFACTURING CO., LTD.). This carbon dioxide pressure in the carbonated drink can be measured in accordance with the Japanese Agricultural Standard. As mentioned in the Japanese Agricultural Standard, the gas internal pressure is defined as follows: "a gas internal pressure of a sample is measured at 20° C. using a gas internal pressure meter in such a manner that a stopcock of the gas internal pressure meter is once opened to vent a gas and, after closing the stopcock again, the bottle is shaken and the value at which a pointer reaches a given position is indicated by kg/cm2".

The bottled carbonated drink of the present invention contains an indigestible dextrin. The indigestible dextrin in the present invention means a water-soluble dietary fiber having a feature of indigestibility, which is obtained by optionally treating a roasted dextrin, prepared by addition of an acid and/or heating of a starch derived from plants such as corn, wheat, rice, beans, tubers, roots, and tapioca, with α-amylase and/or glucoamylase, followed by optional desalting and decolorization. This indigestible dextrin can be obtained, for example, by adding a trace amount of hydrochloric acid to a starch, followed by an enzymatic treatment, and means dextrin containing an indigestible component measured by a high performance liquid chromatography (enzymatic HPLC method) as an analytical method of a dietary fiber disclosed in EISHIN No. 13 ("Analytical methods for nutrients on the standards for nutrition labeling"), and preferably dextrin containing 85 to 95% by mass of an indigestible component. A reduced substance of the indigestible dextrin produced by hydrogenation is also included in the indigestible dextrin contained in the bottled carbonated drink of the present invention. It is possible to use, as the indigestible dextrin and the reduced substance thereof (reduced indigestible dextrin), commercially available products.

The amount of the indigestible dextrin in the carbonated drink of the present invention can be determined by taking blood glucose level rise inhibitory effect, serum cholesterol lowering effect or triglyceride level rise inhibitory effect, and intestine regulating effect into consideration. To exert the effect of foam retention in the carbonated drink, the lower limit of the amount of the indigestible dextrin in the carbonated drink of the present invention can be set, for example, within a range of 0.3% by mass or more, preferably 0.5% by mass or more, and more preferably 0.8% by mass or more. The upper limit of the amount of the indigestible dextrin in the carbonated drink of the present invention can be set, for example, within a range of 2.0% by mass or less, preferably 1.6% by mass or less, more preferably 1.5% by mass or less, and still more preferably 1.3% by mass or less, by taking an influence on flavor of the carbonated drink into consideration. When a drink bottle has a volume of 250 ml or more, the amount of the indigestible dextrin can be set, for example, within a range of 3.0 g or more, and preferably 4.0 g or more per drink bottle, while the upper limit of the amount of the indigestible dextrin can be set, for example, within a range of 40.0 g or less per drink bottle.

In the bottled carbonated drink of the present invention, it is possible to use an indigestible dextrin having DE (which is abbreviation of a dextrose equivalent, and means the value of a reducing power of a sugar liquid per solids based on the assumption that the dextrose equivalent of glucose is 100) of 8 or more and 20 or less. In the bottled carbonated drink of the present invention, it is possible to use an indigestible dextrin in which a glucoside bond 1→4 accounts for 50% or more of glucoside bonds. In the bottled carbonated drink of the present invention, it is also possible to use an indigestible dextrin derived from cornstarch.

The bottled carbonated drink of the present invention contains a caramel composition. The caramel composition contained in the carbonated drink of the present invention may contain a caramel pigment, a caramel malt, and the like, and preferably a caramel pigment. The caramel pigment means a brown pigment of a polymer obtained by thermopolymerizing saccharides, and a polymer obtained by using various polymerization catalysts (for example, an ammonium compound and a sulfurous acid compound) is also included in the caramel pigment used in the present invention.

The caramel pigment is classified into the following four types depending on the method for producing the same, and any caramel pigment produced by any method may be contained in the bottled carbonated drink of the present invention.

Caramel I: which is obtained by a heat treatment of an edible carbohydrate of a starch hydrolysate, a syrup, or saccharides, or obtained by a heat treatment after adding an acid or an alkali without using a sulfurous acid compound and an ammonium compound;

Caramel II: which is obtained by adding a sulfurous acid compound to an edible carbohydrate of a starch hydrolysate, a syrup, or saccharides, or adding an acid or an alkali thereto, followed by a heat treatment, without using an ammonium compound;

Caramel III: which is obtained by adding an ammonium compound to an edible carbohydrate of a starch hydrolysate, a syrup, or saccharides, or adding an acid or an alkali thereto, followed by a heat treatment, without using a sulfurous acid compound; and Caramel IV: which is obtained by adding a sulfurous acid compound and an ammonium compound to an edible carbohydrate of a starch hydrolysate, a syrup, or saccharides, or adding an acid or an alkali thereto, followed by a heat treatment.

In the bottled carbonated drink of the present invention, any caramel pigment can also be used, and is preferably caramel IV.

The amount of the caramel pigment in the bottled carbonated drink of the present invention can be appropriately decided according to solids of the caramel pigment, color tone, and the objective carbonated drink, and can be set, for example, within a range of 0.01 to 0.5% by mass, preferably 0.05 to 0.5% by mass, more preferably 0.07 to 0.3% by mass, and still more preferably 0.07 to 0.2% by mass.

The amount of solids derived from the caramel pigment in the bottled carbonated drink of the present invention is, for example, within a range of 0.025 to 0.25% by mass, preferably 0.035 to 0.15% by mass, and more preferably 0.035 to 0.1% by mass. The amount of solids of the caramel pigment can be measured in accordance with the atmospheric heating drying method (official method) defined in "Guidelines for Food Sanitation Inspection, Physics and Chemistry edition 2005, edited by JAPAN FOOD HYGIENE ASSOCIATION", that is, a sample is dried with heating under normal pressure at predetermined temperature and conditions and then a difference in weight before and after drying is regarded as a moisture content.

Furthermore, when the amount of the caramel pigment in the bottled carbonated drink of the present invention is represented by an absorbance, the absorbance is within a range of 0.3 to 1.0 at 430 nm, 0.1 to 0.8 at 470 nm, 0.1 to 0.7 at 500 nm, 0.03 to 0.5 at 570 nm, and 0.03 to 0.3 at 660 nm, and preferably 0.5 to 0.8 at 430 nm, 0.3 to 0.7 at 470 nm, 0.3 to 0.5 at 500 nm, 0.1 to 0.3 at 570 nm, and 0.03 to 0.1 at 660 nm. Since the maximum absorption does not exist in the caramel pigment, it is preferred to control specification of color by the absorbance at a plurality of wavelengths. In the present invention, "absorbance" means an absorbance at the above-mentioned wavelength measured by a cell with an optical path length of 10 mm after diluting a degassed carbonated drink three times (mass ratio) with deionized water.

The caramel malt means a malt produced through a saccharification treatment and a caramelization treatment, and imparts color and fragrance to a drink which is a product. The caramel malt is a malt defined by chromaticity of 50 to 2500 EBC, which is obtained by steeping a green malt, thereby increasing the moisture amount to about 40%, followed by a saccharification treatment and a caramelization treatment. Commonly, the saccharification treatment is carried out by raising the temperature in barley to about 60 to 75° C., and keeping warm for 30 minutes or more. The caramelization treatment is carried out by raising the temperature to about 120 to 230° C. in a stepwise manner over a long period of time.

When the caramel malt is used for the bottled carbonated drink of the present invention, for example, a given amount of the caramel malt is put in an about 3- to 5-fold boiling water bath and subjected to boiling extraction for about 15 minutes, followed by solid-liquid separation and further centrifugal separation treatment at 6° C. and 3,000 rpm for 30 minutes to prepare an extraction liquid, and then the extraction liquid can be mixed in a drink.

The amount of the caramel malt in the bottled carbonated drink of the present invention can be appropriately decided according to the objective drink, and can be set, for example, within a range of 1.0 to 10% by mass, preferably 2.0 to 8.0% by mass, and more preferably 3.0 to 5.0% by mass.

Since the bottled carbonated drink of the present invention is characterized in that the amount of 4MI in the drink is less than 200 ppb, it is desired to use, as the caramel composition contained in the bottled carbonated drink of the present invention, a caramel composition in which the amount of 4MI is comparatively low. 4MI is a substance produced in the production process of the caramel composition (for example, a caramel pigment and a caramel malt). In the bottled carbonated drink of the present invention, it is also possible to use a caramel composition with reduced 4MI amount which is obtained by treating a caramel pigment or an extraction liquid of a caramel malt with an adsorbent (for example, activated carbon, or white clay such as acid clay or activated clay). When using a caramel pigment in the bottled carbonated drink of the present invention, it is possible to use a caramel pigment having the 4MI concentration of less than 400 ppm, preferably less than 200 ppm, and still more preferably less than 100 ppm, although it varies depending on the amount of the caramel pigment to be added in the carbonated drink. The concentration of 4MI can be measured by known means, and can be measured, for example, under the following conditions using a liquid chromatograph mass spectrometer (LC/MS/MS).

Model (LC): ACCELA (manufactured by Thermo Fisher Scientific K.K.)

Model (MS/MS): TSQ Quantum Discovery MAX (manufactured by Thermo Fisher Scientific K.K.)

Column: Polaris3 C18-A (3 μm), φ4.6 mm×15 cm (manufactured by Agilent Technologies) Column temperature: 40° C.

Mobile phase: mixed solution of water and methanol (50:50)

Flow rate: 0.2 ml/min

Ionization: ESI positive mode

Monitor ions: product ions m/z 56 generated by decomposition of precursor ions m/z 83

Injection amount: 10 μl

The bottled carbonated drink of the present invention can be produced after previously predicting the amount of 4MI in a carbonated drink to be produced, based on the concentration of 4MI in various raw materials and the amounts of the raw materials used. To reduce the amount of 4MI in the bottled carbonated drink produced to a given value, it is possible to use means for treating with activated carbon, or white clay such as acid clay or activated clay.

The amount of 4MI of the bottled carbonated drink of the present invention is less than 200 ppb, preferably less than 100 ppb, more preferably less than 50 ppb, and most preferably less than 30 ppb. By adjusting the amount of 4MI of the bottled carbonated drink of the present invention to less than 200 ppb, foam (foam to be formed onto the top of a surface of the drink) can be retained for a longer time, thus enabling realization of stabilized foam.

Examples of the sweetener used in the bottled carbonated drink of the present invention include a monosaccharide such as fructose or sucrose, a disaccharide, and an oligosaccharide, as well as a high-intensity sweetener, among food additives used for the purpose of imparting sweetness to foods. The high-intensity sweetener is a sweetener in which sweetness sensed, when the high-intensity sweetener is put in the mouth in the same amount (mass) as that of sucrose, becomes about tens to thousands times. The sweetener used in the bottled carbonated drink of the present invention is preferably a high-intensity sweetener.

Examples of the monosaccharide, the disaccharide, and the oligosaccharide used in the bottled carbonated drink of the present invention include glucose, fructose, galactose, maltose, sucrose, lactose, maltotriose, ketose, and the like.

The high-intensity sweetener to be added may be either a natural high-intensity sweetener or a synthetic high-intensity sweetener and includes, for example, aspartame, acesulfame potassium, xylitol, D-xylose, glycyrrhizin and an acid thereof and a salt thereof, saccharin, saccharin sodium, sucralose, D-sorbitol, *stevia* extract, *stevia* powder, thaumatin, abrusoside A, cyclocarioside I, N-acetylglucosamine, L-arabinose, oligo-N-acetylglucosamine, *glycyrrhiza* extract, enzymatically treated *stevia*, a-glucosyltransferase-treated *stevia*, enzymatically treated *glycyrrhiza*, L-sorbose, neotame, luo han guo extract, L-rhamnose, D-ribose, and the like.

The sweetener to be added may be used as a single component, or two or more high-intensity sweeteners may be used in combination. The sweetener preferably includes at least aspartame even when it is added as a single component, or a combination of two or more high-intensity sweeteners is added. The sweetener to be added may be preferably composed of one, or two or more selected from the group consisting of sucrose, fructose, glucose, acesulfame potassium, sucralose, *stevia*, enzymatically treated *stevia*, aspartame, and neotame. When two or more high-intensity sweeteners are used in combination, the amount of the high-intensity sweetener can be indicated by the total amount of two or more high-intensity sweeteners.

It is possible to use, as the high-intensity sweetener contained in the bottled carbonated drink of the present invention, commercially available products and those produced in accordance with a known method. It is also possible to use, as the high-intensity sweetener to be used in the present invention, an extract (for example, a *stevia* extract in the case of *stevia*) of plants containing the objective high-intensity sweetener.

The amount of the high-intensity sweetener in the bottled carbonated drink of the present invention can be appropriately decided according to the objective drink, and can be set, for example, within a range of 0.01 to 0.2% by mass, preferably 0.02 to 0.1% by mass, and more preferably 0.03 to 0.07% by mass.

When using, as the high-intensity sweetener, a combination of aspartame, acesulfame potassium, *stevia*, enzymatically treated *stevia*, and sucralose, it is possible to decide the concentration by taking sweetness and type of a raw drink into consideration.

The bottled carbonated drink of the present invention may be provided as an alcohol-free drink (non-alcoholic drink) and includes, for example, a black-colored carbonated drink (for example, cola-based carbonated drink (preferably, cola drink)), a juice-containing carbonated drink, a non-alcoholic drink, and a beer type drink. The bottled carbonated drink of the present invention can be provided as a colored carbonated drink since the caramel composition is used. The bottled carbonated drink of the present invention is preferably provided as a cola-based drink since the caramel composition and the high-intensity sweetener are used. Here, the cola-based carbonated drink means a carbonated drink obtained by using an extract of seeds of kola tree, Cola *acuminata*, or an equivalent thereof as a base, and mixing an acidifier, a colorant, caffeine, and the like, followed by appropriate seasoning using citrus flavor and various spices.

The bottle of the bottled carbonated drink of the present invention is not particularly limited as long as it has a form capable of providing as a drink, such as a PET bottle, a can, or a bottle. The bottled carbonated drink of the present invention can be preferably provided in an aspect where a PET bottle is filled therewith, and more preferably provided by filling a PET bottle having a volume of 1 to 2 L volume therewith. Since the PET bottle has a comparatively large volume of 1 to 2 L volume, opening and closing are repeated plural times, and the contents are consumed each time, thus causing exuding of a carbon dioxide gas over time. However, in the bottled carbonated drink of the present invention, since foam of a carbon dioxide gas is stabilized, foam of a carbon dioxide gas, which is formed when the carbonated drink is poured into a bottle, can be suppressed to the minimum. Namely, when the bottled carbonated drink of the present invention is provided in an aspect where a PET bottle, particularly a PET bottle having a large volume of 1 to 2 L is filled therewith, shortening of a foam retention time of a carbon dioxide gas, which is formed when poured into a bottle, can be suppressed to the minimum, thus being advantageous in that flavor of the carbonated drink does not deteriorate.

In the production of a carbonated drink of the present invention, there is no particular limitation on additives to be added in the carbonated drink as long as the effects of the present invention are not impaired, it is possible to optionally add additives mentioned above and to contain optional additives. When an acidifier is added, type and addition amount of the acidifier are optional. However, when a drink containing no juice is produced, the acidity can be adjusted within a range of 0.01 to 0.4%, and preferably 0.05 to 0.3%, from the viewpoint of palatability.

The acidity means an acidity which is calculated in accordance with the method for measurement of the acidity defined in the Japanese Agricultural Standard (announcement by the Ministry of Agriculture, Forestry and Fisheries No. 1127 of Aug. 8, 2006). Specifically, the acidity is calculated in terms of citric acid and percentage calculated by the following equation is regarded as the acidity.

$$\text{Acidity (\%)} = A \times f \times 100 / W \times 0.0064$$

where

A: amount (mL) of titration with 0.1 mol/L sodium hydroxide solution f: titer of 0.1 mol/L sodium hydroxide solution W: sample weight (g)

0.0064: weight (g) of citric anhydride corresponding to 1 mL of 0.1 mol/L sodium hydroxide solution When the carbonated drink is allowed to contain juice, it is preferred that the amounts of the above-mentioned polysaccharides (1), a saccharide and a processed product thereof (2), and an acidifier (3) to be added are decided by taking the contribution of juice to soluble solids and the amount of the contribution of juice to acidity into consideration. In this case, it is preferred to adjust each amount of substances (1), (2), and (3), including juice, to the value obtained by summing up the amount of the contribution of juice. It is possible to adjust the pH of the carbonated drink of the present invention usually within a range of 2.5 to 5.5, preferably 2.5 to 4.5, and more preferably 2.5 to 3.5.

The bottled carbonated drink of the present invention can be produced by the production process including the steps of mixing and dissolving raw materials in water to give a liquid preparation having a specified concentration; heating the liquid preparation; cooling the heated liquid preparation to enable absorption of a carbon dioxide gas; and bottling the liquid preparation containing the carbon dioxide gas absorbed therein. The bottled carbonated drink of the present invention may preferably include, in addition to the above-mentioned steps, the step of sterilizing the bottled drink. In the production method which also includes the step of sterilizing the bottled drink, the liquid preparation can always pass through a temperature zone within a range of 80 to 100° C. in the step of heating the liquid preparation. The step of sterilizing the bottled drink may include retaining at 55 to 65° C. for 5 to 30 minutes. The drink thus obtained can be filled in any bottle, for example, a glass bottle, a plastic bottle such as a PET bottle, a metal can, and the like to give a bottled drink.

According to preferred embodiment of the bottled carbonated drink of the present invention, there is provided a bottled cola-based carbonated drink including a high-intensity sweetener (preferably aspartame) and a caramel composition, wherein the drink contains an indigestible dextrin and the amount of 4-methylimidazole in the drink is less than 200 ppb. Here, the cola-based carbonated drink means a carbonated drink obtained by using an extract of seeds of kola tree, Cola *acuminata*, or an equivalent thereof as a base, and mixing an acidifier, a colorant, caffeine, and the like, followed by appropriate seasoning using citrus flavor and various spices.

According to another aspect of the present invention, there is provided a method for producing a bottled carbonated drink including a sweetener and a caramel composition, the method includes adjusting so that the drink contains an indigestible dextrin and the amount of 4-methylimidazole in the drink is less than 200 ppb. The production method of the present invention is characterized in that foam formed of a carbon dioxide gas of the drink is stabilized by adjusting so that the drink contains an indigestible dextrin and the amount of 4-methylimidazole in the drink is less than 200 ppb.

According to another aspect of the present invention, there is provided a method for stabilizing foam of a bottled carbonated drink including a sweetener and a caramel composition, the method includes adjusting so that the drink contains an indigestible dextrin and the amount of 4-methylimidazole in the drink is less than 200 ppb. In the present invention, foam of the bottled carbonated drink means foam of a carbon dioxide gas formed onto the surface of the drink when the carbonated drink is poured into a bottle. "Stabilization of foam" and "improvement in foam retention", which are effects of the present invention, mean that foam of a carbon dioxide gas formed onto the surface of the drink when the carbonated drink is poured into a bottle become stabile, so that foam breaking is suppressed, leading to retention of shape of the foam. Therefore, they are indicators different from "foaming" which indicates ease of foaming when a drink is poured into a bottle in the production of a drink, or when a bottled carbonated drink is poured into a drinking bottle such as a cup. Stabilization of foam of the bottled carbonated drink can be evaluated, for example, by the method mentioned in Test Example 1 of Examples shown below.

With respect to an indigestible dextrin, a sweetener, and a caramel composition to be used in these methods of the present invention, as well as embodiments of the addition thereof and adjustment of the amount of 4MI, reference can be made to mentioned items regarding the bottled carbonated drink of the present invention.

Examples

The present invention will be described in more detail by way of Examples, but the present invention is not limited by the following Examples. In Examples, "percentages" are "by mass" unless otherwise specified. Evaluation was performed independently for each test item.

Test Example 1: Influence of Indigestible Dextrin on Stabilization of Foam (1)

(Test Procedure)
(1) In accordance with the formulation of Table 1 below, each cola-like carbonated drink was experimentally produced by a post-mix method so that each in-bottle gas pressure at 20° C. becomes 0.34 MPa. The post-mix method is a method in which a syrup prepared by mixing a sugar liquid, an acidifier, a flavor, a colorant, and the like is injected into a bottle and then the bottle is filled with a carbon dioxide gas using carbonated water.

TABLE 1

| Raw materials | Test sample 1 | Test sample 2 | Test sample 3 |
|---|---|---|---|
| Indigestible dextrin (%) | 0 | 1.02 | 2.04 |
| Caramel pigment (DDW050) (%) | 0.2 | 0.2 | 0.2 |
| Aspartame (%) | 0.02 | 0.02 | 0.02 |

*Caramel pigment: manufactured by DDW (2) Measurement:
(a) A 500 mL measuring cylinder (42 cm in height and 6.5 cm in inner diameter) (manufactured by SIBATA SCIENTIFIC TECHNOLOGY LTD.) was placed on a portable electronic weighing instrument.
(b) A mouth end of a funnel (manufactured by HARIO CO., LTD.) was connected to a mouth end of a two-way cock made of a resin (6 mm in inner diameter, manufactured by AS ONE Corporation) by a rubber tubing, and then the funnel connected by the rubber tubing and the two-way cock made of a resin were disposed so that the height of the mouth end, to which the rubber tubing of the two-way cock made of a resin is not connected, is set to be the height of 40 cm from a bottom surface inside the measuring cylinder. In this case, the two-way cock made of a resin was disposed so that the cola-like carbonated drink to be poured through the funnel drops onto the center of the bottom surface of the measuring cylinder.
(c) Immediately before the measurement, the above experimentally produced cola-like carbonated drink (150 g) kept at 10° C. or lower was charged in the funnel.
(d) A cock of the two-way cock made of a resin was opened and then the experimentally produced cola-like carbonated drink (100 g) was poured into the bottom of the measuring cylinder. At the time point of 100±5 g displayed by the portable electronic weighing instrument, the cock was closed. At this time point, measurement of the foam retention time was started. As mentioned above, the foam retention time means the time required until foam disappears after pouring the experimentally produced cola-like carbonated drink by closing the cock of the two-way cock made of a resin. Here, "disappearance of foam" was judged by the moment a solution surface was in sight after breakage of a foam layer accumulated on the top of a liquid surface (foam disappears in such a manner that the height of the foam layer accumulated on the liquid surface first, and then foam disappears from the center of the liquid surface to the outside of a circle).

Figure 1:
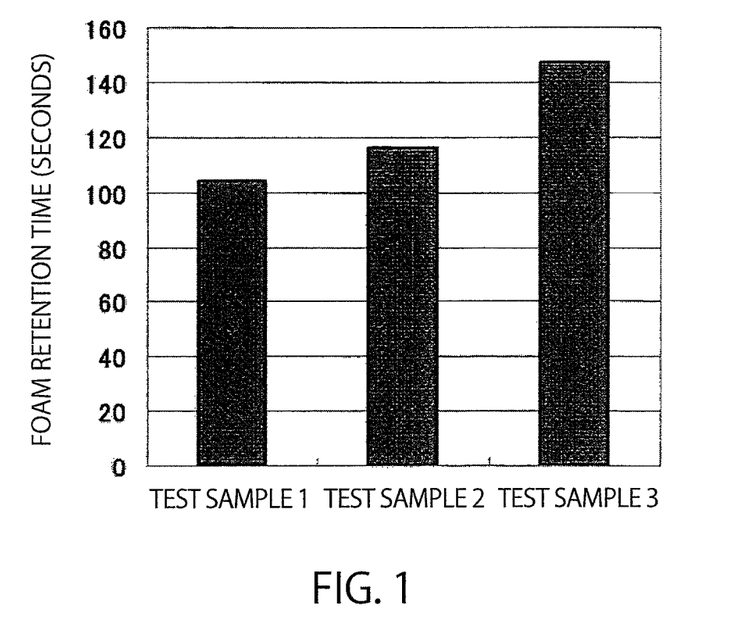
FIG. 1 shows the test results of Test Example 1. The vertical axis denotes a foam retention time (seconds), whereas, the horizontal axis denotes the respective test samples (test samples 1 to 3).

(Results)
The test results of Test Example 1 are shown in FIG. 1. The test was performed three times and an average of foam retention times obtained by measuring three times was determined. The results of FIG. 1 reveal that the foam retention time is prolonged by allowing a carbonated drink to contain an indigestible dextrin, leading to stabilization of foam.

Test Example 2: Influence of Various Caramel Pigments on Stabilization of Foam (1)

(Test Procedure)
(1) In accordance with the formulation of Table 2 below, each cola-like carbonated drink was experimentally produced by a post-mix method so that each in-bottle gas pressure at 20° C. becomes 0.34 MPa.

TABLE 2

| Raw materials | Test sample 4 | Test sample 5 |
|---|---|---|
| Indigestible dextrin (%) | 1.02 | 1.02 |
| Caramel pigment (%) DDW050 (manufactured by DDW) | 0.2 | 0 |
| Caramel pigment (%) DDW034 (manufactured by DDW) | 0 | 0.2 |
| Aspartame (%) | 0.02 | 0.02 |

(2) Measurement:
In the same as in the above-mentioned Test Example 1, the measurement was made of the time required until foam disappears after pouring the cola-like carbonated drink. Using a liquid chromatograph mass spectrometer (LC/MS/MS), the concentration of 4MI in the caramel pigment was measured under the following conditions.

Model (LC): ACCELA (manufactured by Thermo Fisher Scientific K.K.)
Model (MS/MS): TSQ Quantum Discovery MAX (manufactured by Thermo Fisher Scientific K.K.)
Column: Polaris3 C18-A (3 μm), φ4.6 mm×15 cm (manufactured by Agilent Technologies)
Column temperature: 40° C.
Mobile phase: mixed solution of water and methanol (50:50)
Flow rate: 0.2 ml/min
Ionization: ESI positive mode
Monitor ions: product ions m/z 56 generated by decomposition of precursor ions m/z 83
Injection amount: 10 μl (Results)

Figure 2:
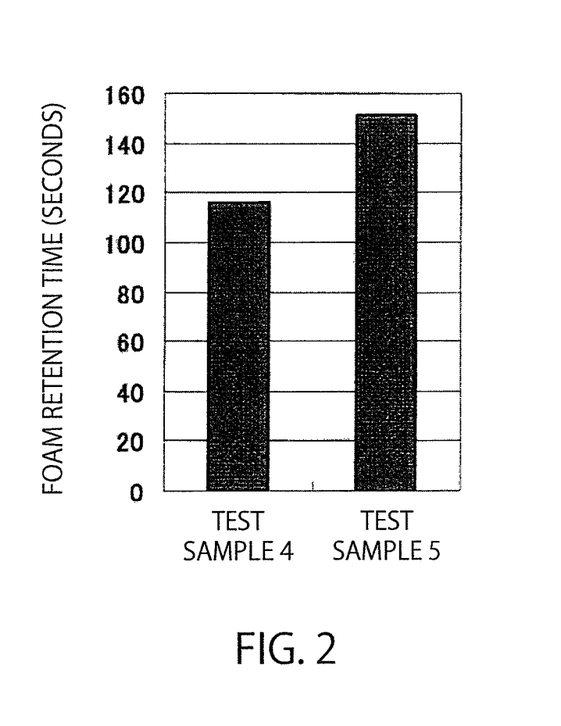
FIG. 2 shows the test results of Test Example 2. The vertical axis denotes a foam retention time (seconds), whereas, the horizontal axis denotes the respective test samples (test samples 4 and 5).

The test results of Test Example 2 are shown in FIG. 2. The test was performed three times and an average of foam retention times obtained by measuring three times was determined. The concentration of 4MI contained in the bottled carbonated drink of the test sample 4 using a caramel pigment DDW050 (manufactured by DDW) was 280 ppb, while the concentration of 4MI contained in the bottled carbonated drink of the test sample 5 using a caramel pigment DDW034 (manufactured by DDW) was 74 ppb. These results reveal that lower amount of 4MI in the caramel pigment contained in the carbonated drink leads to longer foam retention time, thus resulting in stabilization of foam.

Test Example 3: Influence of Various Caramel Pigments on Stabilization of Foam (2)

(Test Procedure)
(1) Each concentrated solution for carbonated drink was prepared by dissolving 5.1% of an indigestible dextrin, 0.1% of aspartame, and 1.0% of each of various commercially available caramel pigments (CDL019, manufactured by AIPU Food Industry Co., Ltd.), DDW050 and DDW034 (both of which are manufactured by DDW). The amount of solids of each caramel pigment was measured in accordance with the above-mentioned atmospheric heating drying method (official method). As a result, the amount of solids was 48.2% for CDL019, 50.5% for DDW050, or 49.7% for DDW034.
(2) Measurement:
(a) A 500 mL measuring cylinder (42 cm in height and 6.5 cm in inner diameter) (manufactured by SIBATA SCIENTIFIC TECHNOLOGY LTD.) was placed on a portable electronic weighing instrument.
(b) A mouth end of a funnel (manufactured by HARIO CO., LTD.) was connected to a mouth end of a two-way cock made of a resin (6 mm in inner diameter, manufactured by AS ONE Corporation) by a rubber tubing, and then the funnel connected by the rubber tubing and the two-way cock made of a resin were disposed so that the height of the mouth end, to which the rubber tubing of the two-way cock made of a resin is not connected, is set to be the height of 40 cm from a bottom surface inside the measuring cylinder. In this case, the two-way cock made of a resin was disposed so that the drink to be poured through the funnel drops onto the center of the bottom surface of the measuring cylinder.
(c) The concentrated solution for carbonated drink (25 g) kept at 5° C. was weighed and then charged in the measuring cylinder.
(d) Immediately before the measurement, 150 g of carbonated water (gas pressure of 0.5 MPa) kept at 5° C. was charged in the funnel.
(e) A cock of the two-way cock made of a resin was opened and then carbonated water (100 g) was poured into the bottom of the measuring cylinder. At the time point of 100±5 g displayed by the portable electronic weighing instrument, the cock was closed. At this time point, the volume of the liquid surface and the volume of the top of foam from the measuring cylinder were read and then measurement of the foam retention time was started. As mentioned above, the foam retention time means the time required until foam disappears after pouring carbonated water by closing the cock of the two-way cock made of a resin. Here, "disappearance of foam" was judged by the moment a solution surface was in sight after breakage of a foam layer accumulated on the top of a liquid surface (foam disappears in such a manner that the height of the foam layer accumulated on the liquid surface first, and then foam disappears from the center of the liquid surface to the outside of a circle). The concentration of 4MI in the caramel pigment was measured in the same manner as in Test Example 2.

(Results)

Figure 3:
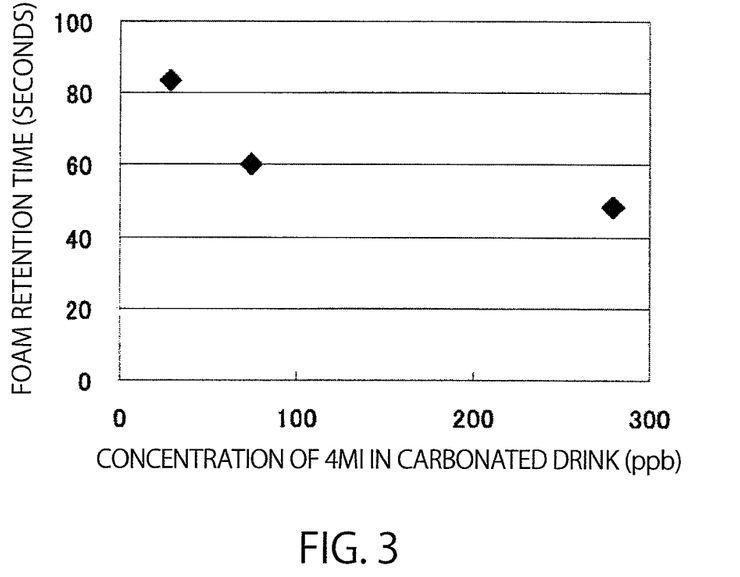
FIG. 3 shows the test results of Test Example 3. The vertical axis denotes a foam retention time (seconds), whereas, the horizontal axis denotes the concentration (ppb) of 4MI in a carbonated drink.

The test results of Test Example 3 are shown in Table 3 and FIG. 3.

TABLE 3

| | Trade name of caramel | Concentration of 4MI in concentrated liquid for carbonated drink (ppm) | Concentration of 4MI in carbonated drink (ppb) | Foam retention time (seconds) |
|---|---|---|---|---|
| Test sample 6 | DDW050 | 1.4 | 280 | 48.5 |
| Test sample 7 | DDW034 | 0.37 | 74 | 60.0 |
| Test sample 8 | CDL-019 | 0.14 | 28 | 83.5 |

The above results reveal that the foam retention time is prolonged when the amount of 4-methylimidazole in the caramel pigment contained in the carbonated drink is less than 200 ppb, thus resulting in stabilization of foam. The amount of solids derived from the caramel pigment in the carbonated drink prepared by mixing each concentrated solution for carbonated drink and carbonated water was 0.10% by mass for the test sample 6, 0.099% by mass for the test sample 7, or 0.096% by mass for the test sample 8.

Test Example 4: Influence of Concentration of 4MI on Stabilization of Foam (1)

(Test Procedure)
(1) Each concentrated solution for carbonated drink was prepared by dissolving 5.1% of an indigestible dextrin, 0.1% of aspartame, 1.0% of a commercially available caramel pigment (CDL019, manufactured by AIPU Food Industry Co., Ltd.), and 4-methylimidazole in each concentration shown in Table 4 below.
(2) Measurement:
In the same manner as in the above-mentioned Test Example 3, the foam retention time was measured. The concentration of 4MI in the caramel pigment was measured in the same manner as in Test Example 2.

(Results)

Figure 4:
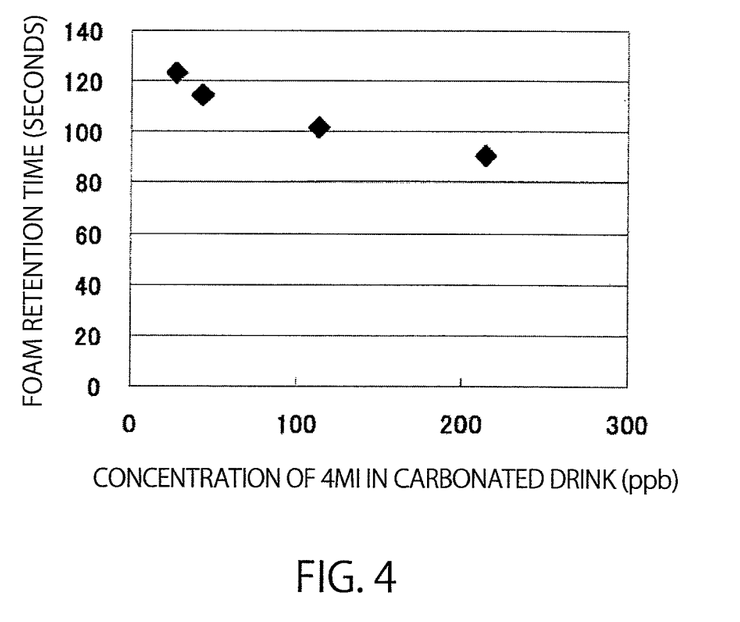
FIG. 4 shows the test results of Test Example 4. The vertical axis denotes a foam retention time (seconds), whereas, the horizontal axis denotes the concentration (ppb) of 4MI in a carbonated drink.

The test results of Test Example 4 are shown in Table 4 and FIG. 4.

TABLE 4

| | Concentration of 4MI in caramel (ppm) | Concentration of 4MI in concentrated liquid for carbonated drink (ppm) | Concentration of 4MI in carbonated drink (ppb) | Foam retention time (seconds) |
|---|---|---|---|---|
| Test sample 9 | 107 | 1.07 | 214 | 90.6 |
| Test sample 10 | 57 | 0.57 | 114 | 102.1 |
| Test sample 11 | 22 | 0.22 | 44 | 114.7 |
| Test sample 12 | 14 | 0.14 | 28 | 122.9 |

The above results reveal that the foam retention time in the carbonated drink is prolonged when the concentration of 4-methylimidazole in the carbonated drink is less than 200 ppb, thus resulting in stabilization of foam.

Test Example 5: Influence of Concentration of 4MI on Stabilization of Foam (2)

A study was made of an influence of the concentration of 4MI on stabilization of foam of a cola-like carbonated drink.
(Test Procedure)
(1) In accordance with the formulation in Table 5 below, each cola-like carbonated drink was experimentally produced by a post-mix method so that each in-bottle gas pressure at 20° C. becomes 0.34 MPa using 1.02% of an indigestible dextrin, 0.04% of aspartame, 0.2% of a commercially available caramel pigment (CDL019, manufactured by AIPU Food Industry Co., Ltd.), and 4-methylimidazole (4MI) in the concentration in Table 5 below.

TABLE 5

| Raw materials | Test sample 13 | Test sample 14 | Test sample 15 | Test sample 16 |
|---|---|---|---|---|
| Indigestible dextrin (%) | 1.02 | 1.02 | 1.02 | 1.02 |
| Caramel pigment (%) | 0.2 | 0.2 | 0.2 | 0.2 |
| Aspartame (%) | 0.04 | 0.04 | 0.04 | 0.04 |
| Concentration of 4MI in carbonated drink (ppb) | 28 | 50 | 100 | 200 |
| Foam retention time (seconds) | 181.3 | 173.7 | 171.7 | 167.8 |

Figure 5:
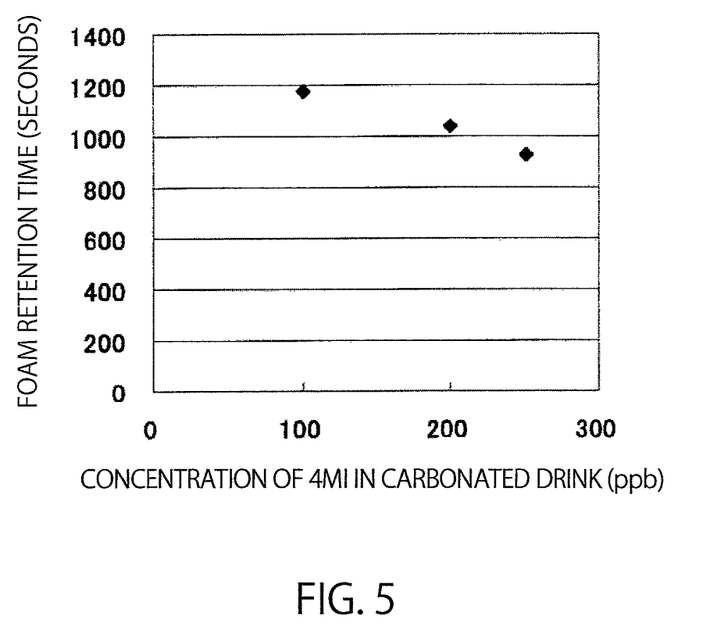
FIG. 5 shows the test results of Test Example 8. The vertical axis denotes a foam retention time (seconds), whereas, the horizontal axis denotes the concentration (ppb) of 4MI in a carbonated drink.

(2) Measurement:
In the same manner as in the above-mentioned Test Example 1, the measurement was made of the time required until foam disappears after pouring the cola-like carbonated drink. The concentration of 4MI in the caramel pigment was measured in the same manner as in Test Example 2.
(Results)
The test results of Test Example 5 are shown in FIG. 5. The test was performed three times and an average of foam retention times obtained by measuring three times was determined. The results of the present Test Example revealed that, in an evaluation method in which the cola-like carbonated drink is experimentally produced and then poured through the funnel, the foam retention time is prolonged depending on the concentration of 4-methylimidazole when the concentration of 4-methylimidazole in the cola-like carbonated drink is within a range of less than 200 ppb, thus resulting in stabilization of foam.

Test Example 6: Influence of Concentration of 4MI on Stabilization of Foam (3)

Using a caramel composition in which the concentration of 4MI was reduced by a treatment with an absorbent such as activated carbon, a cola-like carbonated drink was experimentally produced and then a study was made of an influence of the concentration of 4MI on stabilization of foam of a cola-like carbonated drink.
(Test Procedure)
(1) In accordance with the formulation in Table 6, each cola-like carbonated drink was experimentally produced drink by a post-mix method so that each in-bottle gas pressure at 20° C. becomes 0.34 MPa using 1.02% of an indigestible dextrin, 0.06% of aspartame, and 1.0% of a commercially available caramel pigment (Caramel IV, manufactured by Ikedatohka Industries Co., Ltd.) treated with activated carbon after dilution by 5 times.
(2) Method for treatment of caramel pigment with activated carbon
To reduce 4-methylimidazole (4MI) contained in the caramel pigment, a treatment was performed in accordance with the following procedure.

A caramel pigment (Caramel IV, manufactured by Ikedatohka Industries Co., Ltd.) as a commercially available product was diluted by 5 times with purified water, and then 40 ml of the caramel pigment diluted was dispensed into each of test tubes. To these aqueous caramel pigment solutions, activated carbon (CL-K, manufactured by Ajinomoto Fine-Techno Co., Inc.) was not added or added so that the concentration becomes 1, 2, and 4% by mass, followed by stirring using a Vortex mixer and further contacting at room temperature for 10 minutes. After centrifugation at 3,000 rpm for 10 minutes, 30 ml of the supernatant was recovered by decantation. Furthermore, 30 ml of the supernatant was filtered with a filter having a pore size of 0.45 µm, and then each caramel pigment thus filtered was used for experimental production of a cola-like carbonated drink in the formulation in Table 6.

TABLE 6

| Raw materials | Test sample 17 | Test sample 18 | Test sample 19 | Test sample 20 |
|---|---|---|---|---|
| Indigestible dextrin (%) | 1.02 | 1.02 | 1.02 | 1.02 |
| Caramel pigment (%) | 0.2 | 0.2 | 0.2 | 0.2 |
| Aspartame (%) | 0.06 | 0.06 | 0.06 | 0.06 |
| Concentration of 4MI in carbonated drink (ppb) | 360 | 337 | 295 | 140 |
| Foam retention time (seconds) | 173.2 | 180.4 | 186.3 | 193.2 |

Figure 6:
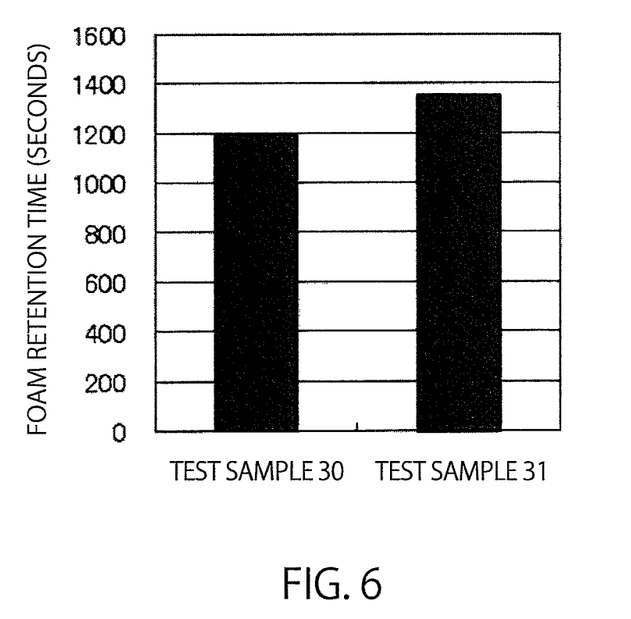
FIG. 6 shows the test results of Test Example 9. The vertical axis denotes a foam retention time (seconds), whereas, the horizontal axis denotes the respective test samples (test samples 30 and 31).

(2) Measurement:
In the same manner as in the above-mentioned Test Example 1, the time required until foam disappears after pouring the cola-like carbonated drink was measured. The concentration of 4MI in the caramel pigment was measured in the same manner as in Test Example 2.
(Results)
The test results of Test Example 6 are shown in FIG. 6. The test was performed three times and an average of foam retention times obtained by measuring three times was determined. The above-mentioned results revealed that the foam retention time is prolonged depending on the concentration of 4MI in the carbonated drink, regardless of the treatment and the preparation method, thus resulting in stabilization of foam.

Test Example 7: Influence of Concentration of Sweetener on Stabilization of Foam A study was made of an influence of a sweetener on stabilization of foam of a cola-like carbonated drink.
(Test Procedure)
(1) In accordance with the formulation in Table 7 below, each cola-like carbonated drink was experimentally produced by a post-mix method so that each in-bottle gas pressure at 20° C. becomes 0.34 MPa using 1.02% of an indigestible dextrin, 0.2% of a commercially available caramel pigment (CDL019, manufactured by AIPU Industry Co., Ltd.), and aspartame in the concentration in Table 7 below.

TABLE 7

| Raw materials | Test sample 21 | Test sample 22 | Test sample 23 | Test sample 24 | Test sample 25 | Test sample 26 |
|---|---|---|---|---|---|---|
| Indigestible dextrin (%) | 1.02 | 1.02 | 1.02 | 1.02 | 1.02 | 1.02 |
| Caramel pigment (%) | 0.2 | 0.2 | 0.2 | 0.2 | 0.2 | 0.2 |
| Aspartame (%) | 0 | 0.02 | 0.03 | 0.06 | 0.1 | 0.2 |
| Concentration of 4MI in carbonated drink (ppb) | 28 | 28 | 28 | 28 | 28 | 28 |
| Foam retention time (seconds) | 0 | 137.6 | 148.8 | 172.4 | 183.3 | 214.3 |

(2) Measurement:

In the same manner as in the above-mentioned Test Example 1, the time required until foam disappears after pouring the cola-like carbonated drink was measured. The concentration of 4MI in the caramel pigment was measured in the same manner as in Test Example 2.

(Results)

The test results of Test Example 7 are shown in FIG. 7. The test was performed three times and an average of foam retention times obtained by measuring three times was determined. The above results revealed that the foam retention time is prolonged depending on the concentration of the sweetener in the carbonated drink, thus resulting in stabilization of foam. Meanwhile, a high-intensity sweetener exerts a large influence on flavor of the carbonated drink even when a small amount of the high-intensity sweetener is added. Therefore, the results of an organoleptic evaluation with four well trained panelist revealed that the concentration of high-intensity sweetener (aspartame) is more preferably within a range of 0.03 to 0.07% by mass in view of design of flavor of the carbonated drink.

Test Example 8: Influence of Concentration of 4MI on Stabilization of Foam (4)

Using a sweetener which is different from that in Test Example 7, a study was made of an influence of the concentration of 4MI on stabilization of foam of a cola-like carbonated drink.

(Test Procedure)

(1) In accordance with the formulation in Table 8 below, each cola-like carbonated drink was experimentally produced by a post-mix method so that each in-bottle gas pressure at 20° C. becomes 0.34 MPa using 1.02% of an indigestible dextrin, 0.06% of stevia, 0.2% of a commercially available caramel pigment (CDL019, manufactured by AIPU Food Industry Co., Ltd.), and 4-methylimidazole (4MI) in the concentration in Table 8 below.

TABLE 8

| Raw materials | Test sample 27 | Test sample 28 | Test sample 29 |
|---|---|---|---|
| Indigestible dextrin (%) | 1.02 | 1.02 | 1.02 |
| Caramel pigment (%) | 0.2 | 0.2 | 0.2 |
| Stevia (%) | 0.06 | 0.06 | 0.06 |
| Concentration of 4MI in carbonated drink (ppb) | 100 | 200 | 250 |
| Foam retention time (seconds) | 1176.5 | 1037.5 | 924.3 |

(2) Measurement:

In the same manner as in the above-mentioned Test Example 1, the time required until foam disappears after pouring the cola-like carbonated drink was measured. The concentration of 4MI in the caramel pigment was measured in the same manner as in Test Example 2.

(Results)

The test results of Test Example 8 are shown in Table 8 and FIG. 5. The test was performed three times and an average of foam retention times obtained by measuring three times was determined. The above results revealed that the foam retention time is prolonged depending on the concentration of 4MI even when stevia is used as the sweetener in the carbonated drink, thus resulting in stabilization of foam.

Test Example 9: Influence of Concentration of 4MI on Stabilization of Foam (5)

Using a caramel composition in which the concentration of 4MI was reduced by a treatment with an absorbent such as activated carbon, a cola-like carbonated drink was experimentally produced and then a study was made of an influence of the concentration of 4MI on stabilization of foam of a cola-like carbonated drink.

(Test Procedure)

(1) In accordance with the formulation in Table 9 below, each cola-like carbonated drink was experimentally produced by a post-mix method so that each in-bottle gas pressure at 20° C. becomes 0.34 MPa using 1.02% of an indigestible dextrin, 0.06% of stevia, 1.0% of a commercially available caramel pigment treated with activated carbon after dilution by 5 times (Caramel IV, manufactured by Ikedatohka Industries Co., Ltd.).

(2) Method for treatment of caramel pigment with activated carbon

In the same manner as in the above-mentioned Test Example 6, a treatment for reducing 4-methylimidazole (4MI) contained in the caramel pigment was performed.

TABLE 9

| Raw materials | Test sample 30 | Test sample 31 |
|---|---|---|
| Indigestible dextrin (%) | 1.02 | 1.02 |
| Caramel pigment (%) | 0.2 | 0.2 |
| Stevia (%) | 0.06 | 0.06 |
| Concentration of 4MI in carbonated drink (ppb) | 295 | 133 |
| Foam retention time (seconds) | 1195.6 | 1350.5 |

(2) Measurement:

In the same manner as in the above-mentioned Test Example 1, the time required until foam disappears after pouring the cola-like carbonated drink was measured. The concentration of 4MI in the caramel pigment was measured in the same manner as in Test Example 2.

(Results)

The test results of Test Example 9 are shown in Table 9 and FIG. 6. The test was performed three times and an average of foam retention times obtained by measuring three times was determined. The above-mentioned results revealed that the foam retention time is prolonged even when *stevia* is used as the sweetener in the carbonate drink, regardless of the treatment for reducing 4MI as the caramel pigment and the preparation method, thus resulting in stabilization of foam.

Test Example 10: Influence of Indigestible Dextrin on Stabilization of Foam (2)

Based on the results of Test Example 7, a study was made on an influence of an indigestible dextrin on stability of foam of a cola-like carbonated drink in the concentration of a sweetener suited in view of design of flavor of the drink.

(Test Procedure)

(1) In accordance with the formulation in Table 10 below, each cola-like carbonated drink was experimentally produced by a post-mix method so that each in-bottle gas pressure at 20° C. becomes 0.34 MPa using 0.06% of aspartame, 0.2% of a commercially available caramel pigment (CDL019, manufactured by AIPU Food Industry Co., Ltd.), and an indigestible dextrin in the concentration in Table 10 below.

TABLE 10

| Raw materials | Test sample 32 | Test sample 33 | Test sample 34 | Test sample 35 | Test sample 36 |
|---|---|---|---|---|---|
| Indigestible dextrin (%) | 0 | 0.30 | 0.50 | 0.80 | 2.04 |
| Caramel pigment (%) | 0.2 | 0.2 | 0.2 | 0.2 | 0.2 |
| Aspartame (%) | 0.06 | 0.06 | 0.06 | 0.06 | 0.06 |
| Concentration of 4MI in carbonated drink (ppb) | 28 | 28 | 28 | 28 | 28 |
| Foam retention time (seconds) | 144.4 | 152.6 | 155.2 | 157.4 | 164.0 |

(2) Measurement:

In the same manner as in the above-mentioned Test Example 1, the time required until foam disappears after pouring the cola-like carbonated drink was measured. The concentration of 4MI in the caramel pigment was measured in the same manner as in Test Example 2.

(Results) The test results of Test Example 10 are shown in Table 10.

The test was performed three times and an average of foam retention times obtained by measuring three times was determined. The above-mentioned results revealed that the foam retention time is prolonged depending on the concentration of the indigestible dextrin in the carbonated drink, thus resulting in stabilization of foam.

What is claimed is:

1. A bottled carbonated drink comprising a high-intensity sweetener and a caramel composition,
    wherein the caramel composition is a caramel pigment,
    wherein the high-intensity sweetener comprises aspartame,
    wherein the high-intensity sweetener comprises 0.01 to 0.2% by mass of the drink,
    wherein the drink contains 0.3 to 2.0% by mass of an indigestible dextrin, and
    wherein the drink comprises a detectable concentration of 4-methylimidazole, said concentration of 4-methylimidazole being no more than 3 ppb.

2. The bottled carbonated drink according to claim 1, wherein the caramel pigment comprises 0.01 to 0.5% by mass of the drink.

3. A method for producing a bottled carbonated drink comprising a high-intensity sweetener and a caramel composition, said method comprising adjusting the drink so that the drink contains 0.3 to 2.0% by mass of an indigestible dextrin,
    wherein the caramel composition is a caramel pigment,
    wherein the high-intensity sweetener comprises aspartame,
    wherein the high-intensity sweetener comprises 0.01 to 0.2% by mass of the drink, and
    wherein the drink comprises a detectable concentration of 4-methylimidazole, said concentration of 4-methylimidazole being no more than 30 ppb.

4. A method for stabilizing foam of a bottled carbonated drink comprising a high-intensity sweetener and a caramel composition, said method comprising adjusting the drink so that the drink contains 0.3 to 2.0% by mass of an indigestible dextrin,
    wherein the caramel composition is a caramel pigment,
    wherein the high-intensity sweetener comprises aspartame,
    wherein the high-intensity sweetener comprises 0.01 to 0.2% by mass of the drink, and
    wherein the drink comprises a detectable concentration of 4-methylimidazole, said concentration of 4-methylimidazole being no more than 30 ppb.

* * * * *